United States Patent
Lee et al.

(10) Patent No.: US 10,024,680 B2
(45) Date of Patent: Jul. 17, 2018

(54) STEP BASED GUIDANCE SYSTEM

(71) Applicant: Toyota Motor Engineering & Manufacturing North America, Inc., Erlanger, KY (US)

(72) Inventors: Christopher P. Lee, Campbell, CA (US); Carlo Cruz, Cincinnati, OH (US); Allison Thackston, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/067,552

(22) Filed: Mar. 11, 2016

(65) Prior Publication Data

US 2017/0261334 A1  Sep. 14, 2017

(51) Int. Cl.
*G01C 21/20* (2006.01)
*G01C 21/36* (2006.01)
*G06K 9/00* (2006.01)
*G01C 21/16* (2006.01)
(Continued)

(52) U.S. Cl.
CPC ......... *G01C 21/3641* (2013.01); *A61H 3/061* (2013.01); *G01C 21/165* (2013.01); *G01C 21/206* (2013.01); *G01C 21/28* (2013.01); *G01C 21/3629* (2013.01); *G01C 21/3652* (2013.01);
(Continued)

(58) Field of Classification Search
CPC ............................ G01C 21/3641; A61H 3/061
See application file for complete search history.

(56) References Cited

U.S. PATENT DOCUMENTS

| | | | |
|---|---|---|---|
| 4,520,501 | A | 5/1985 | DuBrucq |
| 4,586,827 | A | 5/1986 | Hirsch et al. |
| 4,786,966 | A | 11/1988 | Hanson |

(Continued)

FOREIGN PATENT DOCUMENTS

| | | |
|---|---|---|
| CN | 201260746 | 6/2009 |
| CN | 101527093 | 9/2009 |

(Continued)

OTHER PUBLICATIONS

Zhang, Shanjun; Yoshino, Kazuyoshi; A Braille Recognition System by the Mobile Phone with Embedded Camera; 2007; IEEE.

(Continued)

*Primary Examiner* — Jess Whittington
(74) *Attorney, Agent, or Firm* — Snell & Wilmer LLP

(57) ABSTRACT

A device for providing spatial information to a user. The device includes a camera configured to detect image data. The device also includes an accelerometer configured to determine step data. The device also includes a processor connected to the camera and the accelerometer and configured to determine a distance travelled per step of the user based on the image data and the step data. The processor is also configured to determine a distance to a reference point based on the image data. The processor is also configured to determine a number of steps corresponding to the distance to the reference point based on the distance travelled per step of the user. The device also includes an output unit connected to the processor and configured to output the spatial information indicating the number of steps corresponding to the distance to the reference point.

14 Claims, 6 Drawing Sheets

(51) Int. Cl.
*G01C 21/28* (2006.01)
*A61H 3/06* (2006.01)
(52) U.S. Cl.
CPC .... *G06K 9/00664* (2013.01); *A61H 2003/063* (2013.01)

(56) References Cited

U.S. PATENT DOCUMENTS

| | | |
|---|---|---|
| 5,047,952 A | 9/1991 | Kramer |
| 5,097,856 A | 3/1992 | Chi-Sheng |
| 5,129,716 A | 7/1992 | Holakovsky et al. |
| 5,233,520 A | 8/1993 | Kretsch et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,525,568 B2 | 4/2009 | Raghunath |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,351 B2 | 11/2010 | Bourne |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,591,412 B2 | 11/2013 | Kovarik et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,718,672 B2 | 5/2014 | Xie et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori |
| 8,797,141 B2 | 8/2014 | Best et al. |
| 8,797,386 B2 | 8/2014 | Chou et al. |
| 8,803,699 B2 | 8/2014 | Foshee et al. |
| 8,805,929 B2 | 8/2014 | Erol et al. |
| 8,812,244 B2 | 8/2014 | Angelides |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| 8,994,498 B2 | 3/2015 | Agrafioti et al. |
| D727,194 S | 4/2015 | Wilson |
| 9,004,330 B2 | 4/2015 | White |
| 9,025,016 B2 | 5/2015 | Wexler et al. |
| 9,042,596 B2 | 5/2015 | Connor |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson |
| D736,741 S | 8/2015 | Katz |

(56) References Cited

U.S. PATENT DOCUMENTS

| | | |
|---|---|---|
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Arthur Hunter |
| 2003/0133008 A1 | 7/2003 | Stephenson |
| 2003/0133085 A1 | 7/2003 | Tretiakoff |
| 2003/0179133 A1* | 9/2003 | Pepin .................. A61H 3/061 342/357.52 |
| 2004/0056907 A1 | 3/2004 | Sharma et al. |
| 2004/0232179 A1 | 11/2004 | Chauhan |
| 2004/0267442 A1 | 12/2004 | Fehr et al. |
| 2005/0020845 A1 | 1/2005 | Suzuki et al. |
| 2005/0140544 A1* | 6/2005 | Hamel .................. A61H 3/061 342/357.52 |
| 2005/0221260 A1 | 10/2005 | Kikuchi |
| 2005/0259035 A1 | 11/2005 | Iwaki |
| 2005/0283752 A1 | 12/2005 | Fruchter |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1 | 10/2007 | Foss |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0058611 A1 | 3/2009 | Kawamura |
| 2009/0106016 A1 | 4/2009 | Athsani et al. |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves |
| 2010/0042322 A1* | 2/2010 | Won .................. G01C 21/165 701/469 |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina et al. |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston et al. |
| 2013/0155474 A1 | 6/2013 | Roach et al. |
| 2013/0157230 A1 | 6/2013 | Morgan |
| 2013/0184982 A1 | 7/2013 | DeLuca |

(56) References Cited

U.S. PATENT DOCUMENTS

| | | |
|---|---|---|
| 2013/0201344 A1 | 8/2013 | Sweet, III et al. |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |
| 2013/0202274 A1 | 9/2013 | Chan |
| 2013/0228615 A1 | 9/2013 | Gates et al. |
| 2013/0229669 A1 | 9/2013 | Smits |
| 2013/0243250 A1 | 9/2013 | France et al. |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland |
| 2014/0031081 A1 | 1/2014 | Vossoughi |
| 2014/0031703 A1* | 1/2014 | Rayner ............ A61B 5/02055 600/484 |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1 | 2/2014 | Takahama |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 | 5/2014 | Yokoo |
| 2014/0160250 A1 | 6/2014 | Pomerantz |
| 2014/0172361 A1* | 6/2014 | Chiang ............ G01C 22/006 702/160 |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0228649 A1* | 8/2014 | Rayner ............ A61B 5/1118 600/301 |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1* | 11/2014 | Ronen ............ G01S 5/0252 455/456.1 |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1 | 12/2014 | Miskin |
| 2014/0379251 A1 | 12/2014 | Tolstedt |
| 2014/0379336 A1 | 12/2014 | Bhatnager |
| 2015/0002808 A1* | 1/2015 | Rizzo, III ............ A61F 9/08 351/158 |
| 2015/0016035 A1 | 1/2015 | Tussy |
| 2015/0058237 A1 | 2/2015 | Bailey |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0135310 A1 | 5/2015 | Lee |
| 2015/0141085 A1 | 5/2015 | Nuovo et al. |
| 2015/0141873 A1* | 5/2015 | Fei ............ A61B 5/112 600/595 |
| 2015/0142891 A1 | 5/2015 | Haque |
| 2015/0154643 A1 | 6/2015 | Artman et al. |
| 2015/0125831 A1 | 7/2015 | Chandrashekhar Nair et al. |
| 2015/0196101 A1 | 7/2015 | Dayal et al. |
| 2015/0198454 A1 | 7/2015 | Moore et al. |
| 2015/0198455 A1 | 7/2015 | Chen |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1* | 9/2015 | Huang ............ H04W 4/029 455/456.3 |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0324646 A1* | 11/2015 | Kimia ............ G06T 7/80 348/62 |
| 2015/0330787 A1 | 11/2015 | Cioffi et al. |
| 2015/0336276 A1 | 11/2015 | Song |
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0350845 A1* | 12/2015 | Patel ............ H04W 4/029 455/457 |
| 2015/0356345 A1 | 12/2015 | Velozo |
| 2015/0356837 A1 | 12/2015 | Pajestka |
| 2015/0364943 A1 | 12/2015 | Vick |
| 2015/0367176 A1 | 12/2015 | Bejestan |
| 2015/0375395 A1 | 12/2015 | Kwon |
| 2016/0007158 A1* | 1/2016 | Venkatraman ........ H04W 4/023 455/456.2 |
| 2016/0028917 A1 | 1/2016 | Wexler |
| 2016/0042228 A1 | 2/2016 | Opalka |
| 2016/0078289 A1 | 3/2016 | Michel et al. |
| 2016/0098138 A1 | 4/2016 | Park |
| 2016/0156850 A1 | 6/2016 | Werblin et al. |
| 2016/0166197 A1* | 6/2016 | Venkatraman ............ A61B 5/7435 600/301 |
| 2016/0198319 A1 | 7/2016 | Huang |
| 2016/0350514 A1 | 12/2016 | Rajendran |
| 2017/0227574 A1* | 8/2017 | Theytaz ............ G01P 21/00 |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2364855 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 10069539 | 3/1998 |
| JP | 2001304908 | 10/2001 |
| JP | 201012529 | 1/2010 |
| JP | 2010182193 | 8/2010 |
| JP | 4727352 | 7/2011 |
| JP | 2013169611 | 9/2013 |
| KR | 100405636 | 11/2003 |
| KR | 20080080688 | 9/2008 |
| KR | 20120020212 | 3/2012 |

(56) References Cited

FOREIGN PATENT DOCUMENTS

| | | |
|---|---|---|
| KR | 1250929 | 4/2013 |
| WO | WO1995004440 | 2/1995 |
| WO | WO 9949656 | 9/1999 |
| WO | WO 0010073 | 2/2000 |
| WO | WO 0038393 | 6/2000 |
| WO | WO 0179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/008791 | 1/2008 |
| WO | WO 2008015375 | 2/2008 |
| WO | WO 2008/035993 | 3/2008 |
| WO | WO 2008/096134 | 8/2008 |
| WO | WO2008127316 | 10/2008 |
| WO | WO 2010/062481 | 6/2010 |
| WO | WO 2010/109313 | 9/2010 |
| WO | WO 2012/040703 | 3/2012 |
| WO | WO2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO2015092533 | 6/2015 |
| WO | WO 2015108882 | 7/2015 |
| WO | WO2015127062 | 8/2015 |

OTHER PUBLICATIONS

Diallo, Amadou; Sep. 18, 2014; Apple iOS8: Top New Features, Forbes Magazine.
N. Kalar, T. Lawers, D. Dewey, T. Stepleton, M.B. Dias; Iterative Design of a Braille Writing Tutor to Combat Illiteracy; Aug. 30, 2007; IEEE.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16$^{th}$ International Symposium on Wearable Computers; pp. 166-167; 2012.
Singhal; "The Development of an Intelligent Aid for Blind and Old People;" *Emerging Trends and Applications in Computer Science (ICETACS), 2013 1$^{st}$ International Conference*; pp. 182-185; Sep. 13, 2013.
Aggarwal et al.; "All-in-One Companion for Visually Impaired;" *International Journal of Computer Applications*; vol. 79, No. 14; pp. 37-40; Oct. 2013.
"Light Detector" Every Ware Technologies; 2 pages; Jun. 18, 2016.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Shidujaman et al.; "Design and navigation Prospective for Wireless Power Transmission Robot;" IEEE; Jun. 2015.
Wu et al. "Fusing Multi-Modal Features for Gesture Recognition", Proceedings of the 15$^{th}$ ACM on International Conference on Multimodal Interaction, Dec. 9, 2013, ACM, pp. 453-459.

Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" 10$^{th}$ USENIX Symposium on Networked Systems Design and Implementation (NSDI'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.
The Nex Band; http://www.mightvcast.com/#faq; May 19, 2015; 4 pages.
Cardonha et al.; "*A Crowdsourcing Platform for the Construction of Accessibility Maps*"; W4A'13 Proceedings of the 10$^{th}$ International Cross-Disciplinary Conference on Web Accessibility; Article No. 26; 2013; 5 pages.
Bujacz et al.; "*Remote Guidance for the Blind—A Proposed Teleassistance System and Navigation Trials*"; Conference on Human System Interactions; May 25-27, 2008; 6 pages.
Rodriguez et al; "*CrowdSight: Rapidly Prototyping Intelligent Visual Processing Apps*"; AAAI Human Computation Workshop (HCOMP); 2011; 6 pages.
Chaudary et al.; "Alternative Navigation Assistance Aids for Visually Impaired Blind Persons"; Proceedings of Iceapvi; Feb. 12-14 2015; 5 pp.
Garaj et al.; "A System for Remote Sighted Guidance of Visually Impaired Pedestrians"; the British Journal of Visual Impairment; vol. 21, No. 2, 2003; 9 pp.
Coughlan et al.; "Crosswatch: a System for Providing Guidance to Visually Impaired Travelers at Traffic Intersections"; Journal of Assistive Technologies 7.2; 2013; 17 pp.
Sudol et al.; "LookTel — a Comprehensive Platform for Computer-Aided Visual Assistance"; Computer Vision and Pattern Recognition Workshops (Cvprw), 2010 IEEE Computer Society Conference; Jun. 13-18, 2010; 8 pp.
Paladugu et al.; "GoingEasy® with Crowdsourcing in the Web 2.0 World for Visually Impaired Users: Design and User Study"; Arizona State University; 8 pp.
Kammoun et al.; "Towards a Geographic Information System Facilitating Navigation of Visually Impaired Users"; Springer Berlin Heidelberg; 2012; 8 pp.
Bigham et al.; "Viz Wiz: Nearly Real-Time Answers to Visual Questions" Proceedings of the 23nd annual Acm symposium on User interface software and technology; 2010; 2 pp.
Guy et al; "CrossingGuard: Exploring Information Content in Navigation Aids for Visually Impaired Pedestrians" Proceedings of the Sigchi Conference on Human Factors in Computing Systems; May 5-10, 2012; 10 pp.
Zhang et al.; "A Multiple Sensor-Based Shoe-Mounted User Interface Designed for Navigation Systems for the Visually Impaired"; 5th Annual Icst Wireless Internet Conference (Wicon); Mar. 1-3, 2010; 9 pp.
Shoval et al.; "Navbelt and the Guidecane - Robotics-Based Obstacle Avoidance Systems for the Blind and Visually Impaired"; IEEE Robotics & Automation Magazine, vol. 10, Issue 1; Mar. 2003; 12 pp.
Dowling et al.; "Intelligent Image Artificial Vision"; 8th Australian (Anziis); Dec. 10-12, 2003; Processing Constraints for Blind Mobility Facilitated Through Systems Conference.
Heyes, Tony; "The Sonic Pathfinder an Electronic Travel Aid for the http://members.optuszoo.com.au/aheyew40/pa/pf blerf.html; Dec. Vision Impaired";.
Lee et al.; "Adaptive Power Control of Obstacle Avoidance System Using Via Motion Context for Visually Impaired Person." International Conference on Cloud Computing and Social Networking (Icccsn), Apr. 26-27, 2012 4 pp.
Wilson, Jeff, et al. "Swan: System for Wearable Audio Navigation"; 11th IEEE International Symposium on Wearable Computers; Oct. 11-13, 2007; 8 pp.
Borenstein et al.; "The GuideCane - a Computerized Travel Aid for the Active Guidance of Blind Pedestrians"; IEEE International Conference on Robotics and Automation; Apr. 21-27, 1997; 6 pp.

(56) References Cited

OTHER PUBLICATIONS

Bhatlawande et al.; "Way-finding Electronic Bracelet for Visually Impaired People"; IEEE Point-of-Care Healthcare Technologies (Pht), Jan. 16-18, 2013; 4 pp.
Blenkhorn et al.; "An Ultrasonic Mobility Device with Minimal Audio Feedback"; Center on Disabilities Technology and Persons with Disabilities Conference; Nov. 22, 1997; 5 pp.
Maim et al.; "Blind Navigation with a Wearable Range Camera and Vibrotactile Helmet"; 19th Acm International Conference on Multimedia; Nov. 28, 2011; 4 pp.
Shoval et al.; "The Navbelt — a Computerized Travel Aid for the Blind"; Resna Conference, Jun. 12-17, 1993; 6 pp.
Kumar et al.; "An Electronic Travel Aid for Navigation of Visually Impaired Persons"; Communications Systems and Networks (Comsnets), 2011 Third International Conference; Jan. 2011; 5 pp.
Pawar et al.; "Multitasking Stick for Indicating Safe Path to Visually Disable People"; Iosr Journal of Electronics and Communication Engineering (Iosr-Jece), vol. 10, Issue 3, Ver. Ii; May-Jun 2015; 5 pp.
Pagliarini et al.; "Robotic Art for Wearable"; Proceedings of Eurosiam: European Conference for the Applied Mathematics and Informatics 2010; 10 pp.
Greenberg et al.; "Finding Your Way: a Curriculum for Teaching and Using the Braillenote with Sendero Gps 2011"; California School for the Blind; 2011; 190 pp.
Helal et al.; "Drishti: an Integrated Navigation System for Visually Impaired and Disabled"; Fifth International Symposium on Wearable Computers; Oct. 8-9, 2001; 8 pp.
Parkes, Don; "Audio Tactile Systems for Designing and Learning Complex Environments as a Vision Impaired Person: Static and Dynamic Spatial Information Access"; EdTech-94 Proceedings; 1994; 8 pp.
Zeng et al.; "Audio-Haptic Browser for a Geographical Information System"; Icchp 2010, Part Ii, Lncs 6180; Jul. 14-16, 2010; 8 pp.
AiZuhair et al.; "Nfc Based Applications for Visually Impaired People —a Review"; IEEE International Conference on Multimedia and Expo Workshops (Icmew), Jul. 14, 2014; 7 pp.
Graf, Christian; "Verbally Annotated Tactile Maps — Challenges and Approaches"; Spatial Cognition Vii, vol. 6222; Aug. 15-19, 2010; 16 pp.
Hamid, Nazatul Naquiah Abd; "Facilitating Route Learning Using Interactive Audio-Tactile Maps for Blind and Visually Impaired People"; Chi 2013 Extended Abstracts; Apr. 27, 2013; 6 pp.
Ramya, et al.; "Voice Assisted Embedded Navigation System for the Visually Impaired"; International Journal of Computer Applications; vol. 64, No. 13, Feb. 2013; 7 pp.
Caperna et al.; "A Navigation and Object Location Device for the Blind"; Tech. rep. University of Maryland College Park; May 2009; 129 pp.
Burbey et al.; "Human Information Processing with the Personal Memex"; Ise 5604 Fall 2005; Dec. 6, 2005; 88 pp.
Ghiani, et al.; "Vibrotactile Feedback to Aid Blind Users of Mobile Guides"; Journal of Visual Languages and Computing 20; 2009; 13 pp.
Guerrero et al.; "An Indoor Navigation System for the Visually Impaired"; Sensors vol. 12, Issue 6; Jun. 13, 2012; 23 pp.
Nordin et al.; "Indoor Navigation and Localization for Visually Impaired People Using Weighted Topological Map"; Journal of Computer Science vol. 5, Issue 11; 2009; 7 pp.
Hesch et al.; "Design and Analysis of a Portable Indoor Localization Aid for the Visually Impaired"; International Journal of Robotics Research; vol. 29; Issue 11; Sep. 2010; 15 pgs.
Joseph et al.; "Visual Semantic Parameterization — to Enhance Blind User Perception for Indoor Navigation"; Multimedia and Expo Workshops (Icmew), 2013 IEEE International Conference; Jul. 15/2013; 7 pp.
Katz et al; "Navig: Augmented Reality Guidance System for the Visually Impaired"; Virtual Reality (2012) vol. 16; 2012; 17 pp.

Rodriguez et al.; "Assisting the Visually Impaired: Obstacle Detection and Warning System by Acoustic Feedback"; Sensors 2012; vol. 12; 21 pp.
Treuillet; "Outdoor/Indoor Vision-Based Localization for Blind Pedestrian Navigation Assistance"; Wspc/Instruction File; May 23, 2010; 16 pp.
Ran et al.; "Drishti: an Integrated Indoor/Outdoor Blind Navigation System and Service"; Proceeding Percom '04 Proceedings of the Second IEEE International Conference on Pervasive Computing and Communications (PerCom'04); 2004; 9 pp.
Wang, et al.; "Camera-Based Signage Detection and Recognition for Blind Persons"; 13th International Conference (Icchp) Part 2 Proceedings; Jul. 11-13, 2012; 9 pp.
Krishna et al.; "A Systematic Requirements Analysis and Development of an Assistive Device to Enhance the Social Interaction of People Who are Blind or Visually Impaired"; Workshop on Computer Vision Applications for the Visually Impaired; Marseille, France; 2008; 12 pp.
Lee et al.; "A Walking Guidance System for the Visually Impaired"; International Journal of Pattern Recognition and Artificial Intelligence; vol. 22; No. 6; 2008; 16 pp.
Ward et al.; "Visual Experiences in the Blind Induced by an Auditory Sensory Substitution Device"; Journal of Consciousness and Cognition; Oct. 2009; 30 pp.
Merino-Garcia, et al.; "A Head-Mounted Device for Recognizing Text in Natural Sciences"; Cbdar'11 Proceedings of the 4th International Conference on Camera-Based Document Analysis and Recognition; Sep. 22, 2011; 7 pp.
Yi, Chucai; "Assistive Text Reading from Complex Background for Blind Persons"; Cbdar'11 Proceedings of the 4th International Conference on Camera-Based Document Analysis and Recognition; Sep. 22, 2011; 7 pp.
Yang, et al.; "Towards Automatic Sign Translation"; the Interactive Systems Lab, Carnegie Mellon University; 2001; 5 pp.
Meijer, Dr. Peter B.L.; "Mobile Ocr, Face and Object Recognition for www.seeingwithsound.com/ocr.htm; Apr. 18, 2014; 7 pp.. the Blind"; the vOICe,.
Omron; Optical Character Recognition Sensor User's Manual; 2012; 450 pp.
Park, Sungwoo; "Voice Stick"; www.yankodesign.com/2008/08/21/voice-stick; Aug. 21, 2008; 4 pp.
Rentschler et al.; "Intelligent Walkers for the Elderly: Performance and Safety Testing of Va-Pamaid Robotic Walker"; Department of Veterans Affairs Journal of Rehabilitation Research and Development; vol. 40, No. 5; Sep./Oct. 2013; 9pages.
Science Daily; *"Intelligent Walker Designed to Assist the Elderly and People Undergoing Medical Rehabilitation"*; http://www.sciencedaily.com/releases/2008/11/081107072015.htm; Jul. 22, 2014; 4 pages.
Glover et al.; "A Robotically-Augmented Walker for Older Adults"; Carnegie Mellon University, School of Computer Science; Aug. 1, 2003; 13 pp.
OrCam; www.orcam.com; Jul. 22, 2014; 3 pp.
Eccles, Lisa; "Smart Walker Detects Obstacles"; Electronic Design; http://electronicdesign.comJelectromechanical/smart-walker-detects-obstacles; Aug. 20, 2001; 2 pp.
Graft, Birgit; "An Adaptive Guidance System for Robotic Walking Aids"; Journal of Computing and Information Technology - Cit 17; 2009; 12 pp.
Frizera et al.; "The Smart Walkers as Geriatric Assistive Device. The Simbiosis Purpose"; Gerontechnology, vol. 7, No. 2; Jan. 30, 2008; 6 pp.
Rodriquez-Losada et al.; "Guido, the Robotic Smart Walker for the Frail Visually Impaired"; IEEE International Conference on Robotics and Automation (Icra); Apr. 18-22, 2005; 15 pp.
Kayama et al.; "Outdoor Environment Recognition and Semi-Autonomous Mobile Vehicle for Supporting Mobility of the Elderly and Disabled People"; National Institute of Information and Communications Technology, vol. 54, No. 3; Aug. 2007; 11 pp.
Kalra et al.; "A Braille Writing Tutor to Combat Illiteracy in Developing Communities"; Carnegie Mellon University Research Showcase, Robotics Institute; 2007; 10 pp.

(56) References Cited

OTHER PUBLICATIONS

Blaze Engineering; "Visually Impaired Braille"; Braille 'n. Speak Manual; Resource Guide: Assistive Technology http://www.blaize.com; Nov. 17, 2014; for Students who use 5 pages.

AppleVis; an Introduction to Braille Screen Input on 1OS 8; http://www.applevis.com/guides/braille-ios/introduction-braille-screen-input-ios-8, Nov. 16, 2014; 7 pages.

Dias et al.; "Enhancing an Automated Braille Writing Tutor"; IEEE/Rsj International Conference on Intelligent Robots and Systems; Oct. 11-15 2009; 7 pp.

D'Andrea, Frances Mary; "More than a Perkins Brailler: a Review of the Mountbatten Brailler, Part 1"; Afb AccessWorld Magazine; vol. 6, No. 1, Jan. 2005; 9 pp.

Trinh et al.; "Phoneme-based Predictive Text Entry Interface"; Proceedings of the 16th International Acm Sigaccess Conference on Computers & Accessibility; Oct. 2014; 2 pgs.

Merri et al.; "The Instruments for a Blind Teacher of English: the challenge of the board"; European Journal of Psychology of Education, vol. 20, No. 4 (Dec. 2005), 15 pp.

Kirinic et al.; "Computers in Education of Children with Intellectual and Related Developmental Disorders"; International Journal of Emerging Technologies in Learning, vol. 5, 2010, 5 pp.

Campos et al.; "Design and Evaluation of a Spoken-Feedback Keyboard"; Department of Information Systems and Computer Science, Inesc-Id/Ist/Universidade Tecnica de Lisboa, Jul. 2004; 6 pp.

Ebay; Maven (Made in Korea) Neoprene Canon Dslr Camera Curved Neck Strap #6782; http://www.ebay.com/itm/Matin-Made-in-Korea-Neoprene-Canon-Dslr-Camera-Curved-.Neck-Strap-67824281608526018?hash=item41912d18c2:g:---pMAAOSwe-FU6zDa ; 4 pp.

Newegg; Motorola S10-Hd Bluetooth Stereo Headphone w/ Comfortable Sweat Proof Design; http://www.newegg.com/Product/Product.aspx?Item=9SIAONW2G39901&Tpk=9sia0nw2g39901;.

Newegg; Motorola Behind the Neck Stereo Bluetooth Headphone Black/Red Bulk (S9) - Oem; http://www.newegg.com/Product/Product.aspx?Item=N82E16875982212&Tpk=n82e16875982212;.

* cited by examiner

| (FEET PER STEP) | | GENERAL USER | PARTICULAR USER |
|---|---|---|---|
| LOCATION | MALL X | 3.2 | 2.6 |
| | SUBWAY STATION X | 2.7 | -- |
| | OFFICE BUILDING X | 2.1 | -- |
| | SUPERMARKET (ALL TYPES) | 2.3 | 2.5 |
| ENVIRONMENT CATEGORY | INDOORS | 2.4 | 2.4 |
| | OUTDOORS | 3.1 | 2.9 |
| | CROWDED | 2.2 | 1.9 |
| | EMPTY | 3.3 | 3.0 |

FIG. 6

STEP BASED GUIDANCE SYSTEM

BACKGROUND

1. Field

The present disclosure relates to automatic and dynamic adjustment of information provided by a device, and more particularly to a system and a method for generating and providing automatic and dynamic adjustment of spatial information for blind users.

2. Description of the Related Art

Navigation systems are capable of providing navigation instructions to a user based on a current location and a desired destination. Typically, these navigation systems are used in vehicles for providing driving directions. These navigation systems commonly utilize Global Positioning System (GPS) technology for estimating the current location of the vehicle.

More recently, portable navigation systems have been integrated into mobile devices, such as smartphones. Users can now use these portable navigation systems when riding a bicycle, walking, or otherwise proceeding along a route at a slower speed relative to a vehicle. These portable navigation systems, like their vehicle-based counterparts, use GPS technology for estimating a current location of the navigation system. Navigation systems may provide turning instructions as a user approaches a turn, and output the instructions in terms of standardized units of length, such as feet, meters, or yards.

However, individuals having certain disabilities, such as blindness, may not be able to accurately gauge distance in terms of standard measurements, such as feet, meters, or yards. In order for these individuals to gain the most benefit from a navigation system, the navigation system should output the instruction in a unit more intuitive to the user. Furthermore, navigation systems solely using GPS technology may not be as effective indoors, as the margin for error with GPS is too high to provide location information at a sufficiently accurate level. Therefore, navigation systems using solely GPS technology may not be usable or optimal for disabled users, particularly disabled users indoors.

Thus, there is a need for systems and methods for providing more intuitive, more accurate navigation and spatial information to users.

SUMMARY

What is described is a system for providing spatial information to a user. The system includes a camera configured to detect image data. The system also includes an accelerometer configured to determine step data. The system also includes a processor connected to the camera and the accelerometer. The processor is configured to determine a distance travelled per step of the user based on the image data and the step data. The processor is also configured to determine a distance to a reference point based on the image data. The processor is also configured to determine a number of steps corresponding to the distance to the reference point based on the distance travelled per step of the user. The system also includes an output unit connected to the processor. The output unit is configured to output the spatial information indicating the number of steps corresponding to the distance to the reference point.

Also described is a device for providing spatial information to a user. The device includes a camera configured to detect image data. The device includes an accelerometer configured to determine step data and a memory configured to store step distance data for establishing a baseline distance travelled per step. The device also includes a processor connected to the camera and the accelerometer. The processor is configured to determine a distance to a reference point based on the image data. The processor is also configured to determine a number of steps corresponding to the distance to the reference point based on the baseline distance travelled per step. The processor is also configured to determine a distance travelled per step of the user based on the image data and the step data. The processor is also configured to determine an updated distance to the reference point. The processor is also configured to determine an updated number of steps corresponding to the updated distance to the reference point based on the distance travelled per step of the user. The device also includes an output unit connected to the processor. The output unit is configured to output the spatial information indicating the number of steps corresponding to the distance to the reference point. The output unit is also configured to output the updated number of steps corresponding to the updated distance to the reference point.

Also described is a method for providing spatial information to a user. The method includes detecting, by a camera, image data and determining, by an accelerometer, step data. The method includes determining, by a processor, a distance travelled per step of the user based on the image data and the step data. The method includes determining, by the processor, a distance to a reference point based on the image data. The method also includes determining, by the processor, a number of steps corresponding to the distance to the reference point based on the distance travelled per step of the user. The method also includes outputting, by an output unit, the spatial information indicating the number of steps corresponding to the distance to the reference point.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 6 illustrates an exemplary database for storing a baseline step distance for various users and for various environments according to an embodiment of the present invention.

DETAILED DESCRIPTION

Figure 1:
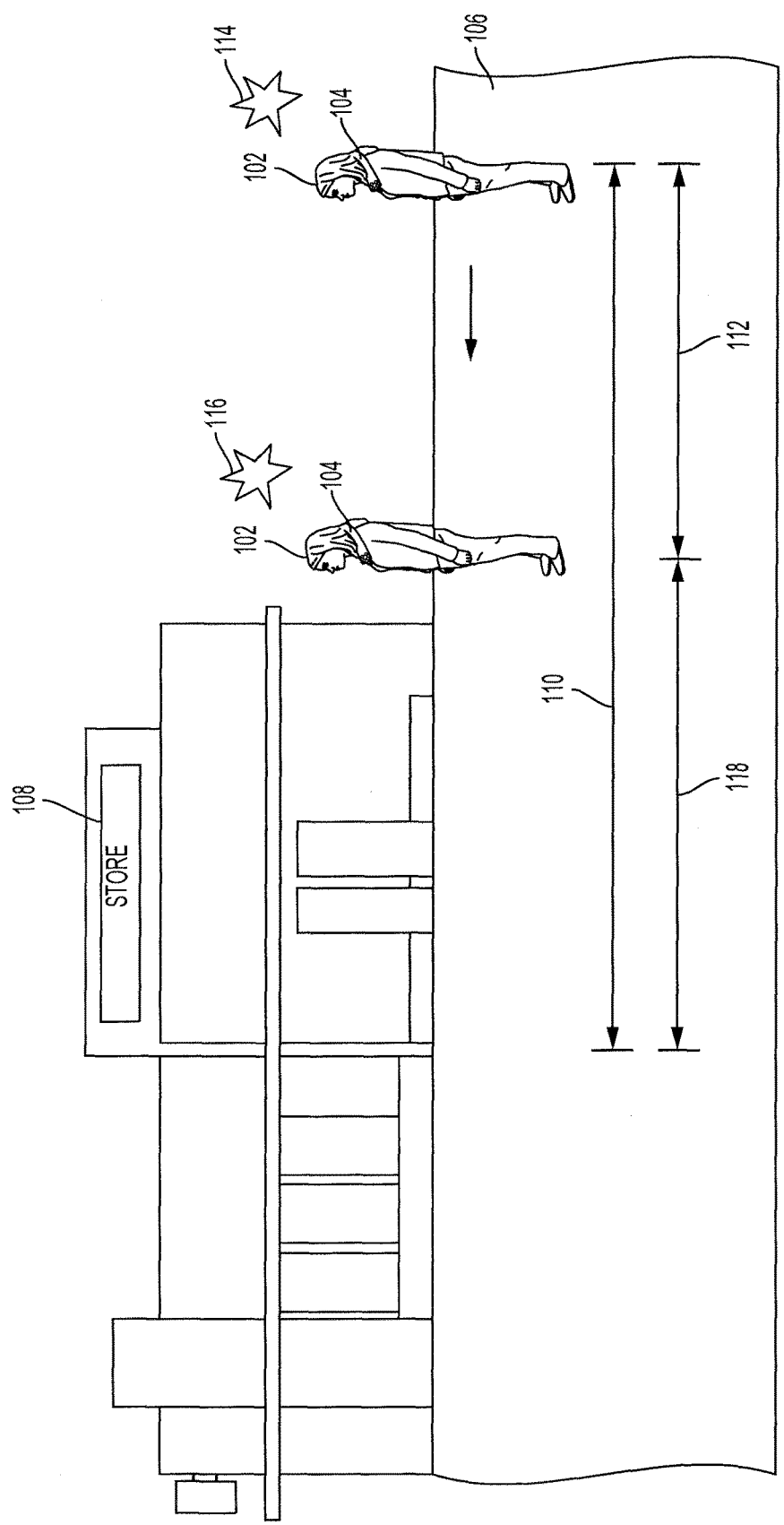
FIG. 1 illustrates an exemplary use of a system for providing spatial information to a user according to an embodiment of the present invention.

Disclosed herein are systems and methods for providing spatial information to a user. The systems and methods provide several benefits and advantages, such as providing a more intuitive indication of distance between a user and a reference point by using steps instead of traditional units of measurement for distance. The benefits and advantages are particularly more significant for disabled individuals, who may have a harder time gauging a given distance. These benefits are achieved by outputting spatial information unique to the user in terms of the user's steps and distance travelled per step. Determining a number of steps to a reference point based on the user's distance travelled per step (e.g., pace, or stride) provides benefits and advantages such as the ability to output information to a user based on individual characteristics of the user. This is advantageous because different users walk with different stride lengths and speeds, so a number of steps determined for one user may not be accurate for another user. For example, a first user who is 5 feet 6 inches tall may have a stride length (e.g., distance travelled per step, or pace) of 2.3 feet and a second user who is 6 feet 10 inches tall may have a stride length of 2.8 feet. If a distance to a point of reference is 50 feet away, the number of steps for the first user is 22 steps and the number of steps for the second user is 18 steps. Providing the number of steps determined for the first user to the second user may result in a high level of inaccuracy based on the difference in stride lengths. As such, more personal and more accurate information is provided by using a number of steps tailored to the user.

Automatically adjusting or calibrating the spatial information based on the user's distance travelled per step provides additional benefits and advantages such as allowing the number of steps to be travelled to change as characteristics of the user or the user's environment change. The systems and methods provide additional benefits and advantages such as the information being tailored to various walking environments of the user such as an incline, decline, crowded environments, empty environments, etc., and also tailored to the particular speed of the user, such as brisk walking, leisurely walking, jogging, running, etc. further allowing accurate information to be communicated to the user. For example, a user may be 50 feet away from a point of reference, walking leisurely, and the system provides spatial information indicating the point of reference is 22 steps away. However, after 10 steps, the user may encounter a situation causing the user to slow down, such as an inclined walkway or a crowd of people. The system may automatically adjust the number of steps and provide updated spatial information indicating the user is now 15 steps away from the point of reference, compared to the 12 steps the user would have thought, if the original distance per step was used.

An exemplary system includes a camera capable of detecting image data corresponding to an environment of a user. The system further includes an accelerometer that is capable of determining step data of a user, such as when the user has taken a step. The system further includes a processor connected to the camera and the accelerometer. The processor is capable of determining a distance travelled per step of the user based on the image data and the step data. The processor is also capable of determining a distance to a reference point based on the image data. The processor is also capable of determining a number of steps corresponding to the distance to the reference point based on the pace of the user. The system further includes an output unit connected to the processor and configured to output the spatial information indicating the number of steps corresponding to the distance to the reference point.

With reference now to FIG. 1, an exemplary system for providing spatial information to a user is illustrated. In many embodiments, spatial information refers to information regarding an environment around the user, including but not limited to, an absolute location of objects and destinations (e.g., object is 30 feet away, location is 50 steps away), a relative location of objects and destinations (e.g., object is 10 feet farther away than another object), or states of the environment (e.g., crowded, empty, incline, decline).

In FIG. 1, a user 102 of a device 104 is walking along a path 106, such as a sidewalk. The device 104 is illustrated as a wearable device resembling a necklace, but other devices, such 3as a wearable smart watch or a smartphone may be used. As the user 102 is walking, the device 104 determines a distance travelled by the user 102 per step of the user 102. The device 104 may determine the distance travelled per step by determining when the user 102 takes a step, and how far the user 102 has travelled between steps. In some embodiments, the device 104 determines when the user 102 has taken a step using an accelerometer, and the device 104 determines a distance the user 102 has travelled between steps using a camera and/or stereo cameras. In some embodiments, the device 104 uses image data from the camera and/or stereo cameras combined with location data from a map of the environment to determine the distance the user has travelled between steps.

The device 104 identifies a reference point 108. In some embodiments, the reference point 108 is dynamically chosen based on the surroundings of the user. In some embodiments, the system may recognize a location based on the image data detected by the camera and provide spatial information to the user associated with the location. For example, a user may frequently patronize a chain of coffee shops, and when the device 104 recognizes a location associated with the chain of coffee shops, the device 104 may provide spatial information to the user, such as "Coffee Shop X is 30 steps away to your right."

In some embodiments, the reference point 108 is a destination being navigated to and is specified by the user. In some embodiments, the reference point 108 is a checkpoint, an intermediate location or a landmark relative to a destination being navigated to.

Once the device 104 identifies the reference point 108, the device 104 determines a distance 110 to the reference point 108. The device 104 may determine the distance 110 to the reference point 108 using one or more of an inertial measurement unit (IMU), a camera, stereo cameras offset by a stereo distance and information associated with the environment, such as a map.

The device 104 determines a number of steps to the reference point 108 based on the determined distance travelled per step and the determined distance 110 to the reference point 108. The device 104 provides an output 114 of the number of steps to the reference point 108, to the user 102. In some embodiments, the output 114 is an audio output. In some embodiments, the audio output is communicated through a speaker 318 on the device 104. In some embodiments, the audio output includes an identification of the reference point 108 and the number of steps to the reference point 108. For example, if the distance 110 to the reference point 108 is 100 feet, and the user travels 2.5 feet per step, the output 114 may be an audio output of "Store X approaching in 40 steps to your right." In some embodiments, the output is a tactile output. In some embodiments, the device 104 includes a vibration unit 320 and may communicate information to the user 102 using varying lengths and combinations of vibration tones.

By providing the output in terms of number of steps, the device 104 provides more intuitive, more useful information to the user 102, especially if the user 102 is disabled or otherwise unable to accurately determine distances.

The user 102 may travel a distance 112 toward the reference point 108. Upon traveling this distance 112, the device 104 may provide an updated number of steps to the reference point 108. In some embodiments, the device 104 determines an updated number of steps by decrementing the number of steps communicated previously in the output 114 by a number of steps taken by the user in the distance 112 travelled toward the reference point 108. In some embodiments, the device 104 determines an updated number of steps by determining an updated distance travelled per step by the user 102 and determining an updated distance 118 to the reference point 108, and using those values to determine the updated number of steps to the reference point 108.

Upon determining the updated number of steps to the reference point 108, the device 104 provides an updated output 116 to the user with the updated number of steps to the reference point 108. The updated output 116 may be provided in the same manner or a different manner as described with respect to the output 114. For example, the output 114 may be an audio output and when the user 102 is within a threshold distance of the reference point 108, the updated output 116 may be a vibration indicating the user 102 is a number of steps away from the reference point 108, such as five vibration pulses indicating the user 102 is five steps away. In another example, the output 114 and the updated output 116 may be communicated in the same manner, for purposes of consistency. Output preferences may be determined by the user 102 and may be changed by the user at any time.

The device 104 may update the number of steps to the reference point 108 periodically. In some embodiments, the device 104 updates the number of steps to the reference point 108 every five minutes, every minute, every 30 seconds, etc. The device 104 may also update the number of steps to the reference point 108 when a step distance adjustment trigger is detected. In some embodiments, a step distance adjustment trigger is a change in speed that exceeds a threshold change in speed, as detected by an accelerometer 312 or an IMU 324. In some embodiments, a step distance adjustment trigger is a change in the environment, such as an inclined walking surface, a declined walking surface, or an increase in presence of other people or things around the user 102, as detected by a camera 308, stored map data, or an IMU 324.

The device 104 may determine the distance travelled by the user 102 per step based on one step, or may wait to collect a threshold number of samples of distance travelled per step before making a determination of the distance travelled by the user 102 per step. The device 104 may provide an initial estimate of the number of steps based on the step distance data stored in a memory 304. The step distance data may include a baseline distance travelled per step, for purposes of providing an initial estimate. In some embodiments, the stored step distance data is based on historical data associated with the user 102. In some embodiments, the stored step distance data is based on historical data of many users, and associated with the location. In some embodiments, the memory 304 is local to the device 104. In some embodiments, the memory is remotely located, such as on a cloud-based storage, and may be accessed by the device 104 remotely, such as via Wi-Fi or via a cellular radio network. The distance travelled per step may initially be provided by the user 102 or may initially be determined from attributes of the user 102, such as height, weight, and gender.

In some embodiments, the device 104 may discard or ignore outliers. For example, if the user 102 stumbles, pauses, or takes small steps to negotiate an obstacle, such as litter on the ground, the distance travelled by the user per step may be skewed or inaccurate. The device 104 may also discard distance data associated with climbing up and down stairs, as the distance travelled per step while climbing up and down stairs may not be representative of the user's distance travelled per step for flat (or substantially flat) surfaces. The device 104 may detect climbing up or down stairs based on a combination of accelerometer data, camera image data, IMU data and/or map data associated with the environment of the user 102. In some embodiments, if stairs are between the user 102 and a reference point, the number of steps in the stairs may be presented to the user in the output. The number of steps in the stairs may be determined by the camera or by map data associated with the environment.

Figure 2:
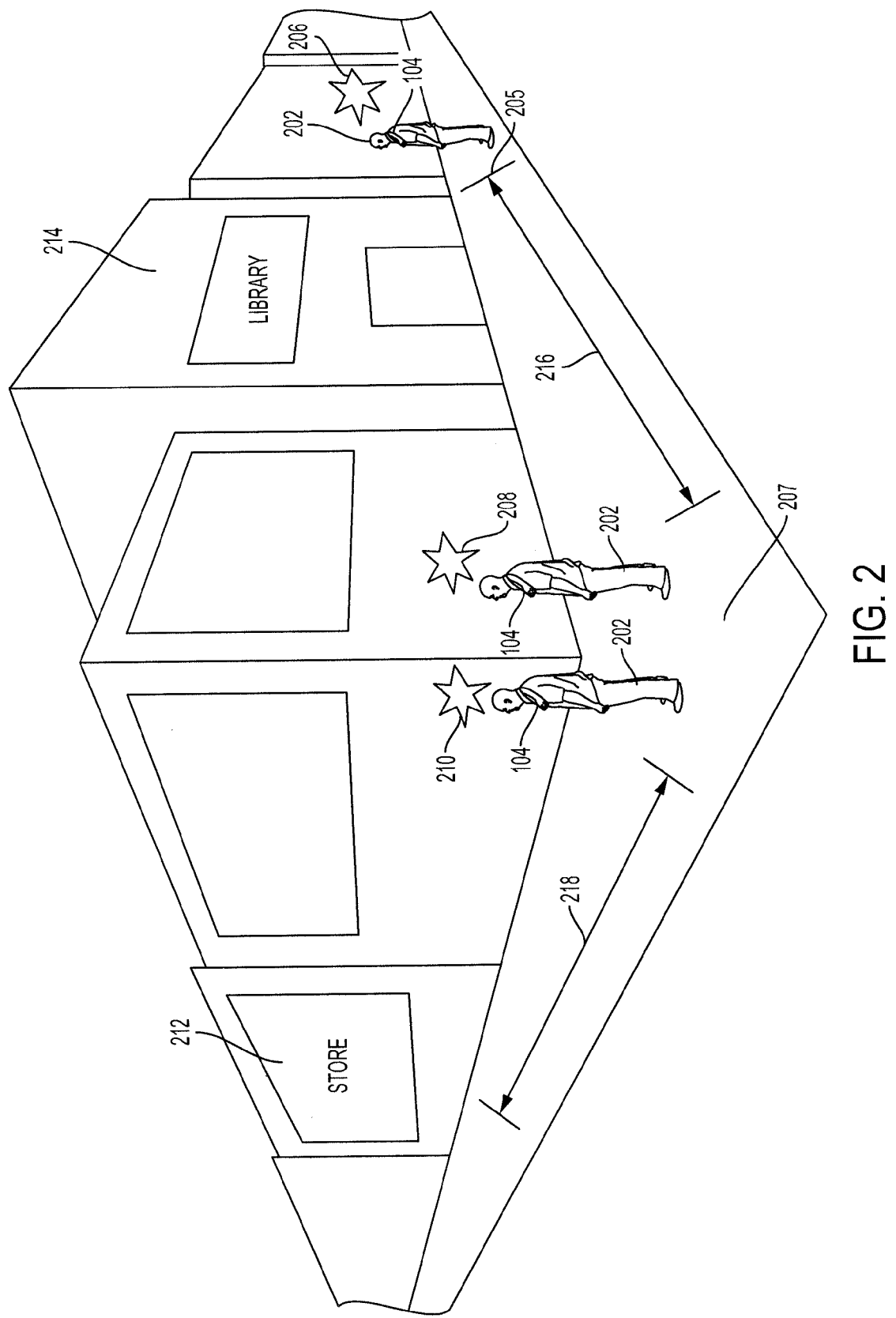
FIG. 2 illustrates an exemplary use of a system for providing spatial information to a user according to an embodiment of the present invention.

With reference now to FIG. 2, another exemplary system for providing spatial information to a user is illustrated. A user 202 of a device 104 is receiving navigation instructions from the device 104 in order to get to the destination 212. The user 202 is initially at location 205 and receives an output 206 from the device 104 regarding the number of steps to reach a reference point 207, whereupon the user 102 will turn 90 degrees to the user's right hand side. The output 206 may also include information regarding a number of steps to a related point of reference 214 by determining a distance between the user's 102 initial location 205 and the related point of reference 214. In an example embodiment, a user 102 on the way to a book store 212 may be interested in a library 214 along the way. The device 104 may deteiuiine the point of reference 214 is a library based on the image data from a camera of the device 104, or from the location data associated with the user's 102 geographic location, and then may determine it is a related point of reference based on common attributes between the destination 212 and the point of reference 214. In some embodiments, a point of reference is a related point of reference if it is a location the user frequently identifies as a destination to be navigated to.

The device 104 may determine the number of steps from a location 205 to a reference point 207 by determining a distance travelled per step and determining a distance 216 to the reference point 207, as described herein. The device 104 may determine a distance per step value based on the user's distance travelled per step for the session or may determine the distance per step value based on a distance per step value stored in a memory 304.

Once the user 202 has reached the reference point 207, the device 104 may provide an output 208 that notifies the user 202 to perform the next step in the directions, such as turn 90 degrees to the right hand side. Once the user 202 has turned 90 degrees to the right hand side, the device 104 provides an output 210 indicating a number of steps corresponding to a new or remaining distance 218 to the destination 212. In some embodiments, the device 104 determines that the user has performed a turn using an IMU 324 or a gyroscope. The device 104 determines the number of steps corresponding to the distance 218 to the destination 212 based on the distance travelled per step of the user 202 and the distance 218 to the destination, each determined as described herein.

Figure 3:
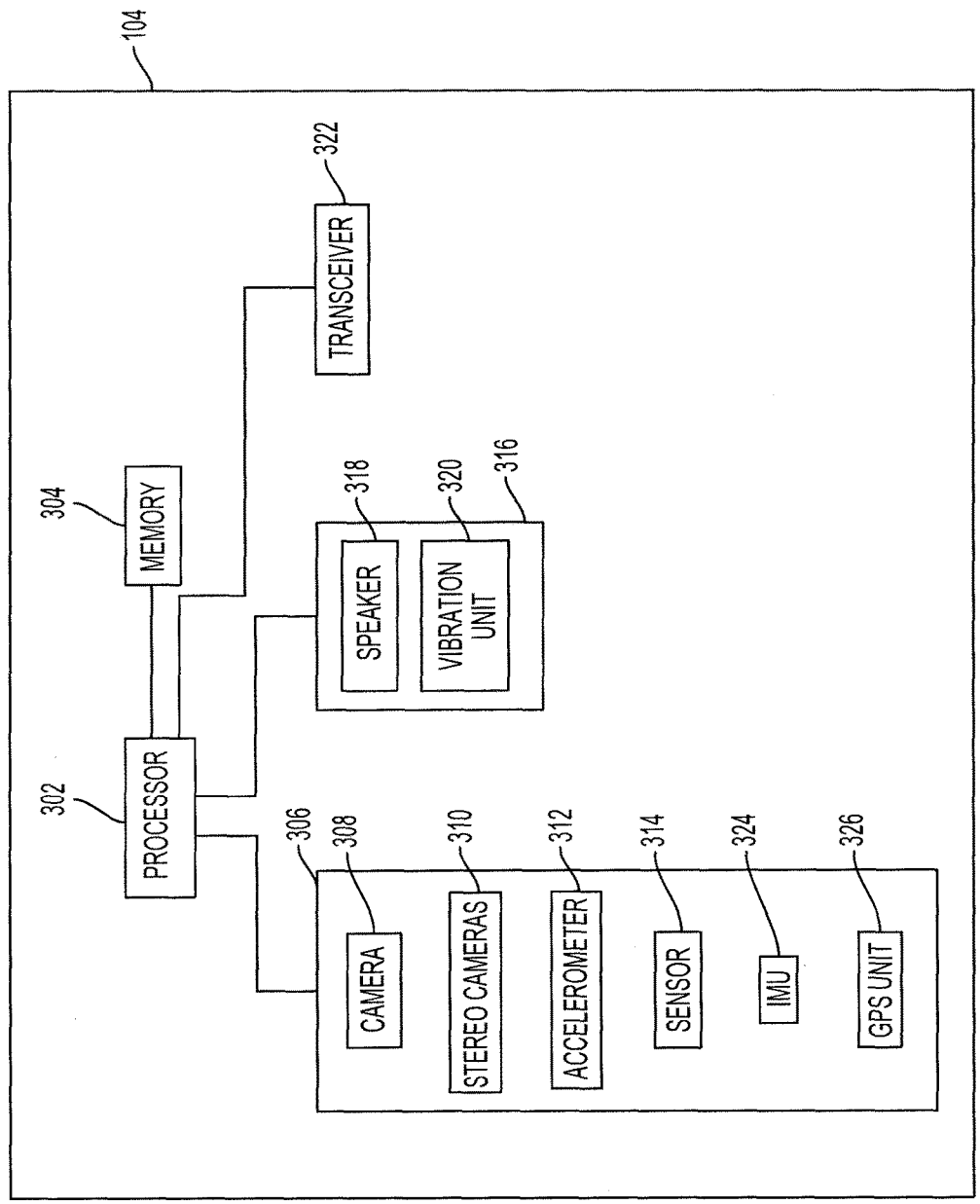
FIG. 3 is a block diagram of components of a system for providing spatial information to a user according to an embodiment of the present invention.

In one implementation and with reference to FIG. 3, a device 104 includes a processor 302, connected to a memory 304, a sensor array 306, an output unit 316, and a transceiver 322.

The processor 302 may be a computer processor such as an ARM processor, DSP processor, distributed processor, microprocessor, controller, or other processing device. The processor 302 may be located in the device 104, may be a remote processor or it may be a pairing of a local and a remote processor.

The memory 304 may be one or any combination of the following: a RAM or other volatile or nonvolatile memory, a non-transitory memory or a data storage device, such as a hard disk drive, a solid state disk drive, a hybrid disk drive or other appropriate data storage. The memory 304 may further store machine-readable instructions which may be loaded into or stored in the memory 304 and executed by the processor 302. As with the processor 302, the memory 304 may be positioned on the device 104, may be positioned remote from the device 104 or may be a pairing of a local and a remote memory. The memory 304 may also store step distance data and information associated with the environment, such as map data.

The sensor array 306 includes a camera 308, stereo cameras 310, an accelerometer 312, a sensor 314, a GPS unit 326, and an IMU 324. The stereo cameras 310 may be a stereo camera pair including two cameras offset by a stereo distance, and configured to detect image data to be used by the processor 302 for determining a distance to an object. The stereo cameras 310 may be used instead of or in conjunction with the camera 308 to detect image data. The sensor 314 may be one or more sensors which provide further information about the environment in conjunction with the rest of the sensor array 306 such as one or more of a temperature sensor, an air pressure sensor, a moisture or humidity sensor, a gas detector or other chemical sensor, a sound sensor, a pH sensor, a smoke detector, an altimeter, a depth gauge, a compass, a motion detector, a light sensor, or other sensor. The GPS unit 326 may be used to determine a geographical location. As is described herein, locations determined using the GPS unit 326 may not provide enough accuracy to be a basis for providing step numbers, but may be accurate enough to determine a location, such as a particular mall or a particular office building. The IMU 324 may include the accelerometer 312 or may be a separate device.

The output unit 316 includes a speaker 318 and a vibration unit 320. The speaker 318 may be one or more speakers or other devices capable of producing sounds and/or vibrations. The vibration unit 320 may be one or more vibration motors or actuators capable of providing haptic and tactile output.

The transceiver 322 can be a receiver and/or a transmitter configured to receive and transmit data from a remote data storage or other device. The transceiver 322 may include an antenna capable of transmitting and receiving wireless communications. For example, the antenna may be a Bluetooth or Wi-Fi antenna, a cellular radio antenna, a radio frequency identification (RFID) antenna or reader and/or a near field communication (NFC) unit.

Figure 4:
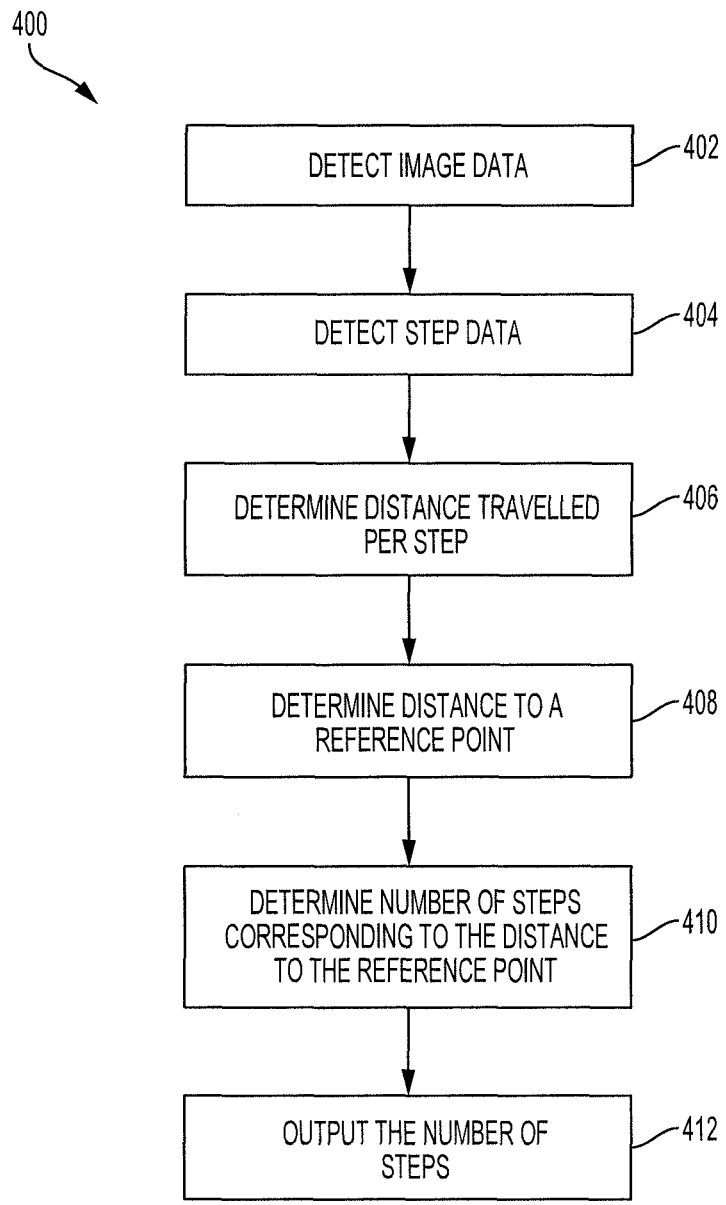
FIG. 4 illustrates a method for determining a number of steps corresponding to a distance to a reference point based on a distance travelled per step of a user according to an embodiment of the present invention.

With reference now to FIG. 4, a method 400 may be used by a device such as the device 104 for providing spatial information to a user.

The image data is detected by the camera 308 and/or the stereo cameras 310 of the device 104 (step 402). In some embodiments, the image data includes data regarding the environment of the device 104. The step data is detected by the accelerometer 312 of the device 104 (step 404). In some embodiments, the step data includes an indication of when the user took a step.

A distance travelled per step is determined by the processor 302 (step 406). The processor 302 determines the distance travelled per step based on the image data and the step data by comparing the image data when steps are taken to determine a change in distance travelled between steps. For example, the user may be walking through a shopping mall and the image data may include a series of images of stores and objects near the user, with each image taken when the user takes a step. The processor 302 compares consecutive images within the series of images to determine a change in distance travelled by the user. Since the images were taken when the user took a step, the determined change in distance between consecutive images provides a distance travelled per step. In some embodiments, map data associated with the location of the user that is stored in the memory 304 is also used to determine the distance travelled between steps by comparing the image data to the map data.

A distance to a reference point is determined by the processor 302 (step 408). The distance to the reference point is determined based on the image data. In some embodiments, the map data is also used to determine the distance to the reference point. A number of steps corresponding to the distance to the reference point is determined by the processor 302 (step 410). The number of steps corresponding to the distance to the reference point is determined using the distance travelled per step and the distance to the reference point.

The spatial information is output to the user, including the determined number of steps to the reference point (step 412). As described herein, the output of the spatial information indicating the number of steps may be an audio output provided by the speaker 316, or it may be a series of vibrations provided by the vibration unit 320.

Figure 5:
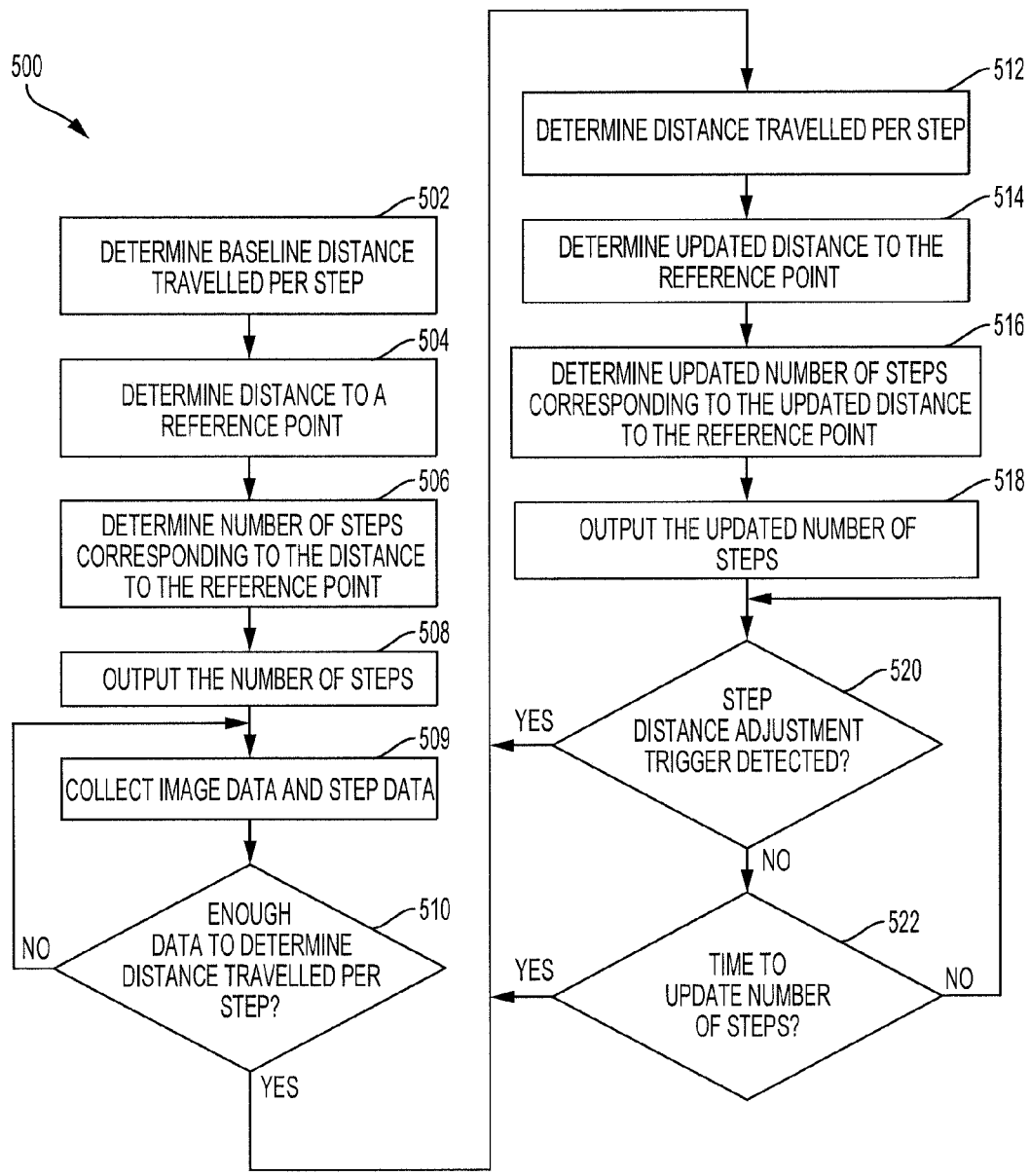
FIG. 5 illustrates a method for dynamically adjusting a number of steps corresponding to a distance to a reference point based on a changing distance travelled per step of a user according to an embodiment of the present invention.

With reference now to FIG. 5, a method 500 may be used by a processor, such as the processor 302 for providing updated spatial information to the user.

A baseline distance travelled per step is determined by the processor 302 (step 502). In some embodiments, the baseline distance travelled per step is determined based on historical step distance data associated with the user. In some embodiments, the baseline distance travelled per step is determined based on historical step distance data associated with the location of the user. For example, the distance travelled per step of all users in a particular mall may be aggregated and the mean or median may be calculated in order to determine a baseline distance travelled per step for a user at the particular mall.

A distance to the reference point is determined by the processor 302 (step 504). As described herein, a camera 308 and/or stereo cameras 310 may be used to determine the distance to the reference point. In some embodiments, the reference point is a place or an object recognized by the device 104 based on a comparison of stored images and image data detected by the camera 308 and/or the stereo cameras 310. In some embodiments, the reference point is a location identified by the user.

A number of steps corresponding to the distance to the reference point is determined by the processor 302 based on the determined baseline distance travelled per step and the determined distance to the reference point (step 506). The number of steps is output by the output unit 316 (step 508). As described herein, the output may be an audio output provided by a speaker 318 or a tactile output provided by a vibration unit 320.

The device 104 collects image data and step data using the camera 308 and the accelerometer 312, respectively (step 509). It is determined whether enough data has been collected to determine a distance travelled per step (step 510). In some embodiments, the processor 302 determines whether a threshold number of data points of distance travelled per step have been collected. In some embodiments, the threshold number is predetermined by the user or is a value associated with the device 104.

When enough data has been collected, a distance travelled per step is determined by the processor 302 (step 512). The distance travelled per step is determined based on the image data and the step data. A distance to the reference point is determined based on the image data (step 514). In some embodiments, the distance determined in step 504 is different than the distance determined in step 514, as the user may have moved closer to the reference point or farther away.

An updated number of steps to the reference point is determined by the processor 302 (step 516). The number of steps is determined based on the distance travelled per step determined in step 512 and the updated distance to the reference point determined in step 514. The output unit 316 provides an output including the updated number of steps to the reference point, determined in step 516 (step 518).

It is determined whether a step distance adjustment trigger is detected (step 520). In some embodiments, the step distance adjustment trigger is detected by the processor 302. In some embodiments, the processor 302 compares data received from one or more elements of the sensor array 306 with a list or table of step distance adjustment triggers. When there is a match, the processor 302 determines a step distance adjustment trigger is detected. For example, the accelerometer 312 may provide device acceleration data to the processor 302. The device acceleration data is compared to a list or table including an acceleration threshold, and when the device acceleration data exceeds the acceleration threshold, the step distance adjustment trigger is detected, as an increase in acceleration may indicate that the user of the device 104 has begun moving faster (e.g., walking at a faster rate, jogging, or running) and the distance between steps may have increased accordingly. Conversely, a deceleration may be detected, and when the deceleration exceeds a deceleration threshold, the step distance adjustment trigger is detected, as deceleration may indicate that the user of the device 104 has slowed down (e.g., going from running to jogging, running to walking, or from a brisk walk to a slow walk) and the distance between steps may have decreased accordingly.

When the step distance adjustment trigger is detected by the processor 302, the process proceeds to step 512, where the distance travelled per step is updated (step 512), the distance to the reference point is updated (step 514), the number of steps corresponding to the updated distance to the reference point is updated (step 516), and the output is provided indicating the updated number of steps (step 518).

When the step distance adjustment trigger is not detected, it is determined whether a time to update the number of steps is reached (step 522). In some embodiments, the number of steps to the reference point is periodically updated and the updated number of steps is provided to the user to keep the user apprised as to the user's progress toward the reference point. In some embodiments, the frequency by which the number of steps to the reference point is updated is determined by the user.

When the time to update the number of steps is reached, the process proceeds to step 512, where the distance travelled per step is updated (step 512), the distance to the reference point is updated (step 514), the number of steps corresponding to the updated distance to the reference point is updated (step 516), and the output is provided indicating the updated number of steps (step 518).

With reference now to FIG. 6, a database 600 associates step distances for a general user 602 and a particular user 604 with various locations 606 and environment categories 608. The database 600 may be stored in a memory of a device 104 and accessible by a processor using a method similar to the methods 400 and 500. The database 600 may also be stored in a remote location and accessible via the transceiver 322.

Each of the various locations 606 and environment categories 608 may be distinguished based on various characteristics. The locations 606 may correspond to particular geographical locations, such as a particular mall (Mall X), a particular subway station (Subway Station X), or a particular office building (Office Building X). The locations 606 may also correspond to general locations such as a supermarket. The locations 606 may be identified using geographic coordinates or may be identified based on image data detected by camera 308 and/or stereo cameras 310. For example, the image data may capture a name of a subway station or a series of store names in a mall, allowing the device 104 to identify a particular location. The locations 606 may also be identified using GPS data received by the GPS unit 326.

The environment categories 608 may correspond to conditions, such as whether the device is indoors or outdoors or whether the environment is crowded or empty. In some embodiments, the environment category 608 to apply is determined based on the image data from the camera 308. For example, the camera 308 and/or the stereo cameras 310 may detect the image data indicating the user is indoors or in a crowded environment. In some embodiments, the sensor data from the sensor 314 is used to determine the environment category to apply.

As described herein, the location 606 and the environment categories 608 may have associated step distance data for a general user 602 and a particular user 604. The data for the general user 602 may be aggregated and determined based on the step distance data for all users in the particular location or the environment category. In contrast, the data for the particular user 604 is based on the step distance data for the particular user only.

In some embodiments, the device 104 will determine whether stored step distance data is available for the particular user 604 for the current location and/or the current type of environment. When step distance data for the particular user 604 is available, the user's step distance data is used to establish a baseline distance travelled per step for the particular user 604. When step distance data for the particular user 604 in the current location and the current type of environment is unavailable, the general user's 602 step distance data is used to establish the baseline distance travelled per step for the user. In an example embodiment, when the device 104 detects that the particular user 604 is at the Mall X, and a baseline distance travelled per step is to be determined, 2.6 feet per step is used as the distance travelled per step, for purposes of determining the number of steps to reference points. When the device 104 detects that the particular user 604 is at Subway Station X, there is no stored step distance data for the particular user 604 at Subway Station X, so 2.7 feet per step is used, which corresponds to the stored step distance data for the general user 602.

In some embodiments, more than one of the locations 606 and environments 608 may apply, such as a crowded indoor mall. The corresponding stored step distance data for the applicable conditions may be averaged, or the median may be used. In an example embodiment, if the particular user 604 is at Mall X and it is crowded, the values of 2.6 and 1.9 may be averaged to determine a baseline distance travelled per step for the user.

The step distance data may be updated based on determined distance travelled per step while the user is within a particular category. For example, if the database 600 is used, and the device 104 detects the particular user 604 is at Subway Station X and it is crowded, and the particular user 604 averages 2.5 feet per step while the user is at Subway Station X, then the values associated with the particular user 604 for Subway Station X and for a crowded environment may be added or modified. In the example database 600, there is no value for the particular user 604 at Subway Station X, so 2.5 is stored in the corresponding entry. For the particular user 604 in crowded environments, a value of 1.9 is currently stored, but it may be modified by the 2.5 feet per step the particular user 604 averaged in this session.

In some embodiments, additional environment categories 608 and locations 606 may be added. For example, if the user goes to a location not listed in the locations 606 more than a threshold number of times, the particular location may be added to the list of locations 606.

In some embodiments, when there is no value associated with the particular user 604 for a location 606 or environment category 608, an average distance travelled per step of the particular user 604 for all locations and environments is used. In some embodiments, the average distance travelled per step of the particular user 604 for all locations and environments is averaged with the general user 602 data for the corresponding location 606 and/or environment category 608.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing, to a user, a navigation route to a reference point, the system comprising:
    a camera configured to detect image data;
    an accelerometer configured to determine step data;
    a processor connected to the camera and the accelerometer, the processor configured to:
        determine a distance travelled per step of the user based on the image data and the step data,
        determine a distance to the reference point based on initial image data,
        determine an initial number of steps corresponding to the distance to the reference point based on the distance travelled per step of the user,
        detect a change in travelling speed of the user,
        determine whether the change in travelling speed exceeds a threshold,
        determine an updated distance travelled per step of the user and an updated distance to the reference point when the change in travelling speed of the user exceeds the threshold, and
        determine an updated number of steps corresponding to the updated distance to the reference point based on the updated distance travelled per step of the user; and
    an output unit connected to the processor and configured to output spatial information indicating the initial number of steps corresponding to the distance to the reference point and the updated number of steps corresponding to the updated distance to the reference point.

2. The system of claim 1, further comprising a memory configured to store step distance data for establishing a baseline distance travelled per step.

3. The system of claim 2, wherein the step distance data is based on historical step distance data associated with the user.

4. The system of claim 2, wherein the step distance data is based on historical step distance data associated with a location of the user.

5. The system of claim 1, wherein the processor is further configured to update the number of steps corresponding to the distance to the reference point based on detecting a step distance adjustment trigger.

6. The system of claim 1, wherein the processor is further configured to periodically determine, along the navigation route, an updated distance to the reference point based on updated image data.

7. A device for providing spatial information to a user, comprising:
    a camera configured to detect image data;
    an accelerometer configured to determine step data;
    a memory configured to store step distance data for establishing a baseline distance travelled per step;
    a processor connected to the camera and the accelerometer, the processor configured to:
        determine an initial distance to a reference point based on only the image data;
        determine an initial number of steps corresponding to the initial distance to the reference point based on the baseline distance travelled per step;
        determine a current distance travelled per step of the user based on the image data and the step data;
        determine an updated distance to the reference point; and
        determine an updated number of steps corresponding to the updated distance to the reference point based on the current distance travelled per step of the user; and
    an output unit connected to the processor and configured to output the spatial information indicating the initial number of steps corresponding to the initial distance to the reference point and the updated number of steps corresponding to the updated distance to the reference point.

8. The device of claim 7, wherein the processor is further configured to update the stored step distance data based on the determined current distance travelled per step of the user.

9. The device of claim 7, wherein the current distance travelled per step of the user based on the image data and the step data is determined when a threshold amount of image data is detected and a threshold amount of step data is determined.

10. The device of claim 7, wherein the baseline distance travelled per step is an average of step distance data associated with a location of the user and an environment of the user.

11. The device of claim 7, wherein the step distance data is based on historical step distance data associated with the user.

12. The device of claim 7, wherein the step distance data is based on historical step distance data associated with a location of the user.

13. A method for providing spatial information to a user, comprising:

detecting, by a camera, image data;

determining, by an accelerometer, step data;

determining, by a processor, an initial distance travelled per step of the user based on the image data and the step data;

determining, by the processor, an initial distance to a reference point based on the image data;

determining, by the processor, an initial number of steps corresponding to the initial distance to the reference point based on the initial distance travelled per step of the user;

outputting, by an output unit, the number of steps corresponding to the initial distance to the reference point;

detecting, by the accelerometer, an acceleration or deceleration of the user exceeding a threshold;

determining, by the processor, an updated distance travelled per step of the user and an updated distance to the reference point;

determining, by the processor, an updated number of steps corresponding to the updated distance to the reference point based on the updated distance travelled per step of the user; and outputting, by the output unit, the updated number of steps corresponding to the updated distance to the reference point.

14. The method of claim 13, further comprising updating the number of steps corresponding to the distance to the reference point periodically.

* * * * *